United States Patent [19]

Langner

[11] Patent Number: 4,620,818
[45] Date of Patent: Nov. 4, 1986

[54] FLOWLINE CONNECTION MEANS
[75] Inventor: Carl G. Langner, Spring, Tex.
[73] Assignee: Shell Oil Company, Houston, Tex.
[21] Appl. No.: 614,425
[22] Filed: May 25, 1984
[51] Int. Cl.⁴ .............................................. F16L 1/00
[52] U.S. Cl. ................................. 405/169; 166/343; 405/170
[58] Field of Search ....................... 405/195, 169–171; 166/338, 340, 341, 343, 344, 345, 347

[56] References Cited

U.S. PATENT DOCUMENTS

| | | | |
|---|---|---|---|
| 3,640,080 | 2/1972 | Neal | 405/169 X |
| 3,650,114 | 3/1972 | Neal | 405/169 X |
| 3,866,677 | 2/1975 | Baugh | 166/343 |
| 3,955,599 | 5/1976 | Walker | 405/169 X |
| 3,967,462 | 7/1976 | DeJong | 405/169 |
| 4,161,367 | 7/1979 | Cuiper et al. | 166/343 X |

Primary Examiner—Dennis L. Taylor

[57] ABSTRACT

The present invention provides a method and apparatus for connecting a flowline to a subsea structure. A riser and flowline connection tool are deployed downwardly to the subsea structure and a flowline terminal head, which is at the end of the flowline, is pulled to the flowline connection tool by means of a pullcable. Then the flowline terminal head is secured to the subsea structure and the flowline connection tool is recovered to the surface. The flowline terminal head consists of a connector hub with clamping surface to which the flowline is welded, and a flexible carrier pipe of interlocking metallic rings into which the end of the flowline is inserted. The carrier pipe limits the curvature of the flowline as the terminal head is bent into alignment with a flowline receptacle of the subsea structure. The flowline terminal head may include buoyant encircling rings which keep it free of difficult terrain in the vicinity of the subsea structure.

12 Claims, 12 Drawing Figures

FLOWLINE CONNECTION MEANS

BACKGROUND OF THE INVENTION

In accordance with application Ser. No. 499,013 filed May 27, 1983, now U.S. Pat. No. 4,558,972, a flowline bundle is connected to a subsea production facility by using a riser to deploy a flowline connection tool to the production facility and then using the flowline connection tool and a pullcable to pull the flowline bundle to the production facility. To avoid undue stresses in the flowline bundle, due to the terrain around the subsea structures, etc., it is necessary to prepare the terminal end of the flowline bundle so that it may easily move over such terrain. In addition, it is desirable, once the flowline bundle reaches the subsea production facility, to have the bundle readily securable to the facility and fluid connections easily made.

SUMMARY OF THE INVENTION

The primary purpose of the present invention is to provide a method and apparatus for connecting a pipeline or flowline bundle to a subsea structure, which method and apparatus are relatively simple and economical to use, which do not subject the pipeline or flowline bundle to dangerous stresses, which make the pipeline or flowline bundle readily securable to the subsea structure, and which allow the fluid connections to be easily made.

Preferably, a riser and connection tool are deployed downwardly and landed onto the subsea structure, simultaneously as the pipeline or flowline bundle is deployed onto the seabottom a short distance away. A terminal head at the end of the pipeline or flowline bundle is then pulled up to the connection tool using a pullcable and a cable pulling means which is part of the connection tool. Next the connection tool is used to grip, orient, and bend the terminal head (through an angle up to 90 degrees) as necessary to align the terminal head with a flowline receptacle which is part of the subsea structure. Finally, the terminal head is secured to the flowline receptacle of the subsea structure, and the connection tool and riser are recovered to the surface.

More preferably, after being pulled up to the connection tool, the flowline terminal head is secured to the connection tool by pulling a bullnose of the terminal head into a bullnose receptacle of the connection tool. The bullnose receptacle is then used to orient and bend the terminal head into proper alignment with the flowline receptacle. Next, the terminal head is secured to the subsea structure by inserting a connector hub, which is integral with the terminal head, into a mating part of the flowline receptacle. Also more preferably, the terminal head of the present invention includes a carrier pipe of interlocking rings into which the flowline is receivable, and this carrier pipe is encircled by buoyant rings. Most preferably, the buoyant rings are syntactic foam of sufficient size to offset the weight of the carrier pipe, and the interlocking rings limit the bending radius of the carrier pipe, thereby protecting the pipeline or flowline bundle from buckling, etc.

Other purposes, distinctions over the art, advantages and features of the invention will be apparent to one skilled in the art upon review of the following.

DESCRIPTION OF PREFERRED EMBODIMENTS

Figure 1:
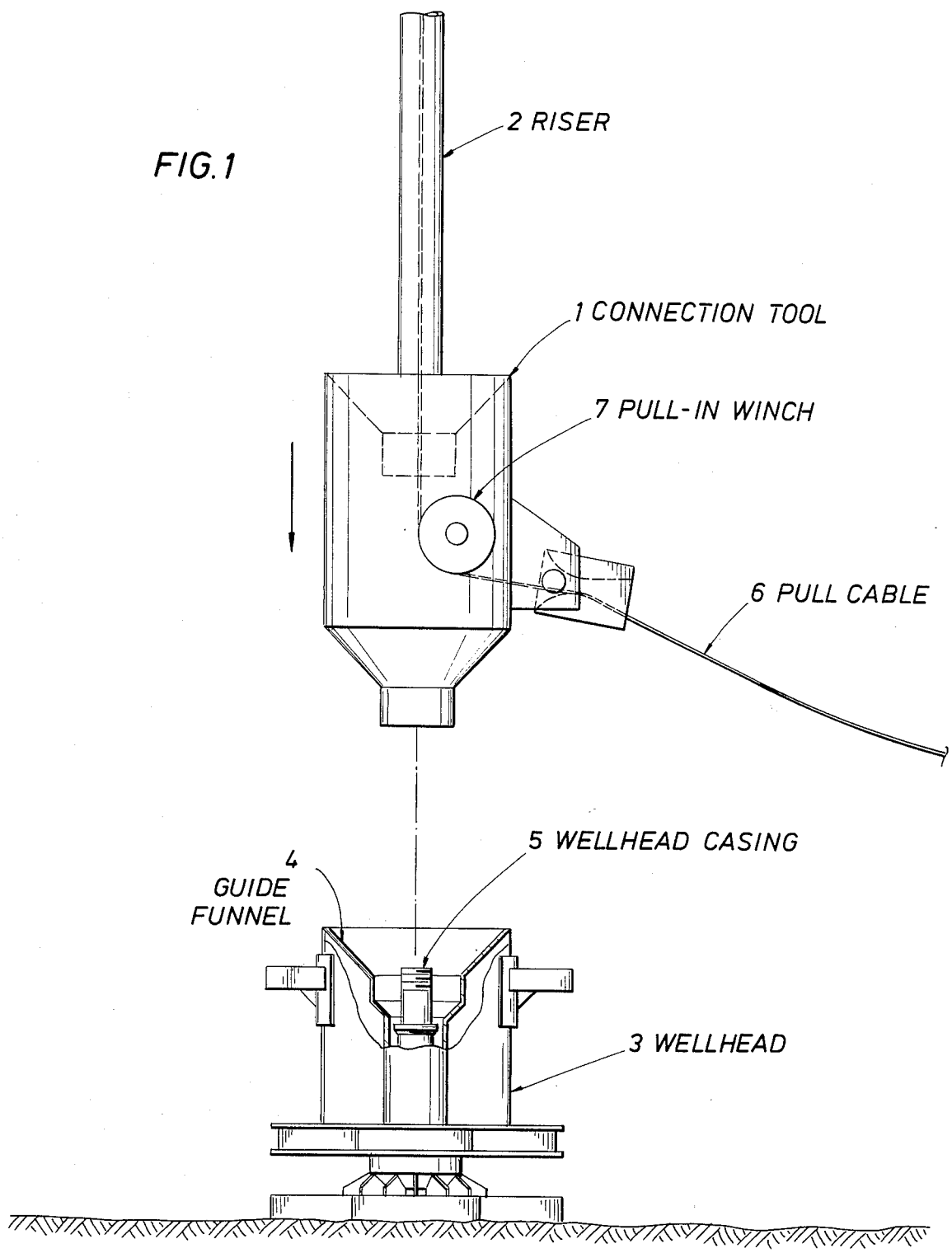
FIG. 1 shows landing a connection tool onto a wellhead.

The present invention is relevant to embodiments wherein an offshore pipeline or flowline bundle (both "pipeline" and "flowline bundle" hereinafter being termed "flowline") is deployed essentially vertically to a subsea structure such as a production facility which may be an individual subsea wellhead, a multi-well subsea template, an underwater manifold center, a tension leg platform base structure, etc. This invention pertains in particular to a method and apparatus for connecting the flowline to the subsea production facility. During the connection operation, the apparatus to be used with a drilling ship (as used hereinafter, "drilling ship" will include all "surface craft" suitable for deploying a "riser" or the like) will typically include a riser, a connection tool, a pullcable, a flowline, a flowline terminal head, and receptacles for both the connection tool and the flowline terminal head, which receptacles are part of the subsea structure. The connection tool is deployed at the lower end of the riser and contains remotely controlled mechanisms for latching onto the subsea structure, for hauling in the pullcable and thereby pulling up the flowline terminal head to the connection tool, for gripping and orienting the terminal head and securing it to the subsea structure, and for releasing from both the flowline terminal head and the subsea structure.

Applicant's co-pending applications Ser. No. 499,013 filed May 27, 1983 now U.S. Pat. No. 4,558,972; Ser. No. 516,086 filed July 22, 1983 now U.S. Pat. No. 4,541,753 and Ser. No. 564,605 filed Dec. 22, 1983 now U.S. Pat. No. 4,588,526 and Ser. No. 614,424 filed May 25, 1984, are incorporated herewith for more specific disclosure of the flowline connection tool and other apparatus and procedures.

The connection of the flowline to the subsea structure is accomplished by first stationing a drilling ship over the subsea structure and deploying a connection tool at the end of a riser down to the subsea structure, such as a wellhead. A pullcable from the connection tool is connected to a terminal head at the end of a flowline, which terminal head typically has flotation that permits the flowline and terminal head to be pulled across terrain surrounding the subsea structure, such as seabottom undulations, boulders, mud, etc., without damage to the flowline or terminal head. The terminal head is then pulled up to the connection tool using the pullcable and a cable pulling means which is part of the connection tool. Next, the connection tool is used to grip, orient, and bend the terminal head (through an angle up to 90 degrees) as necessary to align the terminal head with a flowline receptacle which is part of the subsea structure. Finally, the terminal head is secured to the flowline receptacle, and the connection tool and riser are recovered to the surface.

The present invention is advantageous in comparison to the prior art inasmuch as: (1) the connection procedure is independent of the water depth, and therefore is especially advantageous in very deep waters where conventional methods are found to be difficult and tedious; (2) the flowline, flowline termination, and flowline receptacle can be made small and simple, since all connection operations and controls are incorporated into the connection tool and are transmitted thereto via control lines in the riser; (3) field bending of the flowline into alignment with the flowline receptacle further permits the terminal head to be small and simple, since a shop bend and stiffening means are not utilized.

Having thus generally described the apparatus and method of the present invention, as well as its numerous advantages over the art, the following is a more detailed description thereof, given in accordance with specific reference to the drawings.

As shown in FIG. 1, a connection tool 1, suspended from the end of a riser 2, is positioned above guide funnel 4, which is part of wellhead 3. Extending outward from pull-in winch 7, which is a built-in part of connection tool 1, is pullcable 6. Alternatively, pullcable 6 may pass downward through riser 2 from a winch on the surface vessel, as shown by the dashed line in FIG. 1, and then pass around pulley 7 and outward from connection tool 1.

Figure 2:
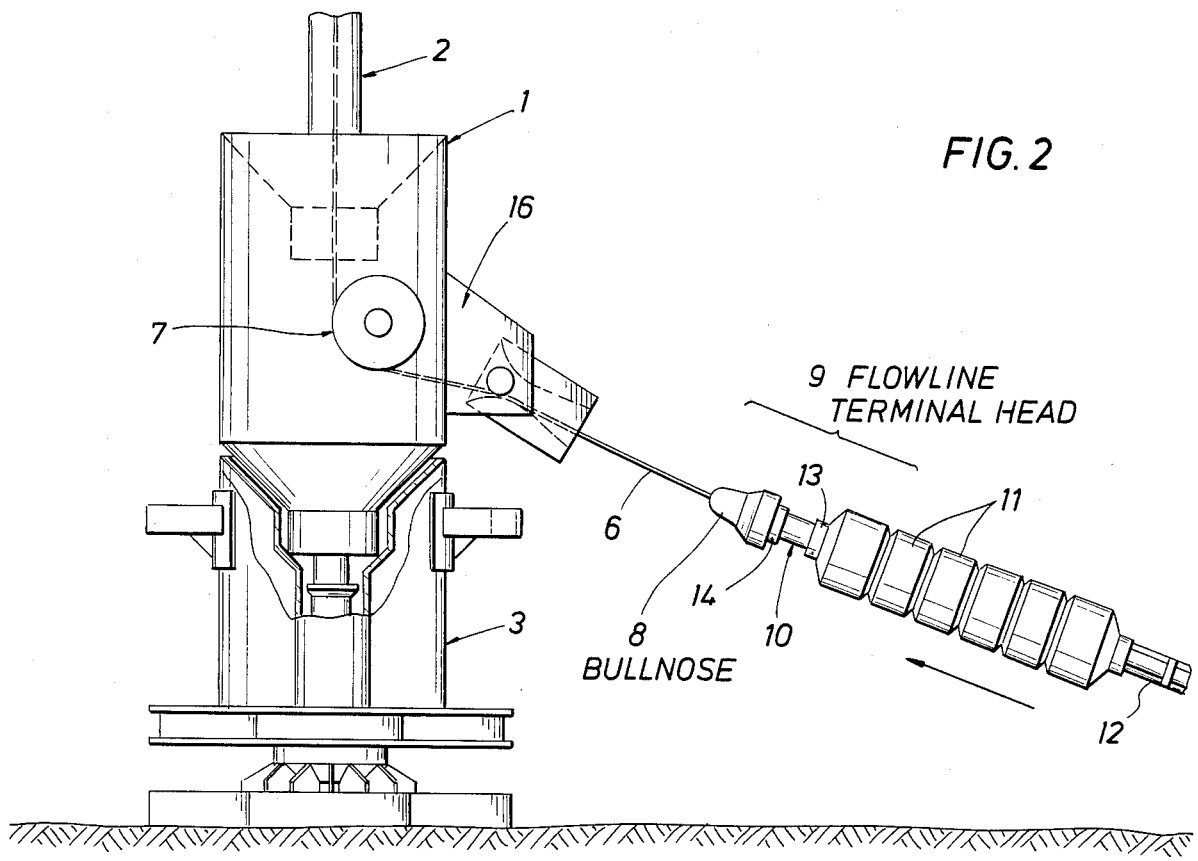
FIG. 2 discloses pulling a flowline terminal head up to the connection tool using a pullcable and a winch which is built into the connection tool.

In FIG. 2, pullcable 6 is shown attached to bullnose 8 at the end of flowline terminal head 9. As shown by the direction of the arrow in FIG. 2, the terminal head 9 is being pulled toward connection tool 1 by pullcable 6. The pulling only occurs after connection tool 1 is securely positioned inside guide funnel 4 of wellhead 3 and latched onto wellhead casing 5. Terminal head 9 has an elongated shape with a clamping surface 10 between bullnose 8 and buoyancy modules 11 into which flowline 12 extends. Flowline 12 is preferably welded to bulkhead 13 at the end of clamping surface 10. On the opposite side of clamping surface 10 from bulkhead 13 is a flowline connector hub 14 which has a built-in special end piece to adapt to a tree connector (not shown). Hereinafter reference to the "connector hub" includes elements 10, 13, and 14. Flowline terminal head 9 is more particularly described hereinafter with reference to FIGS. 10-12.

Figure 3:
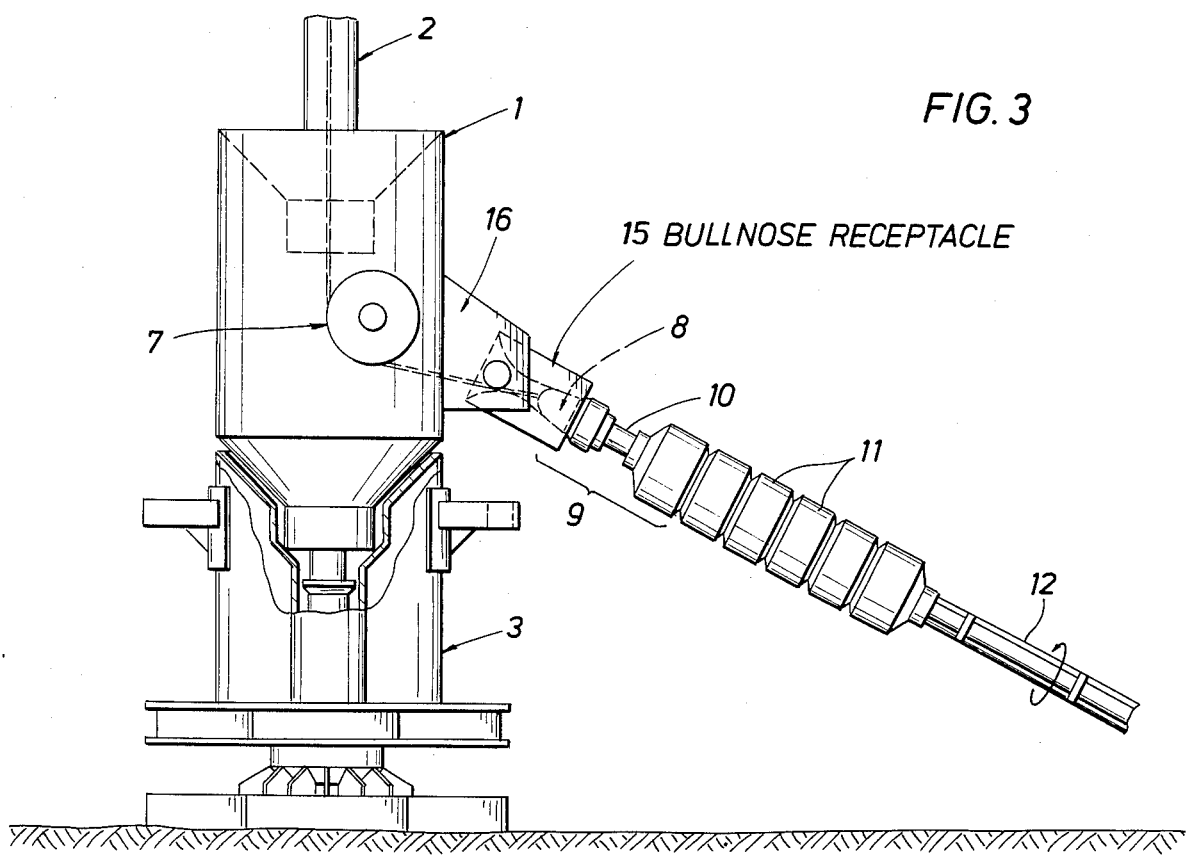
FIG. 3 shows gripping and orienting the terminal head by inserting a bullnose on the terminal head into a bullnose receptacle on the connection tool.

FIG. 3 shows the procedure for gripping and orienting the terminal head 9. Pullcable 6 has pulled bullnose 8 into bullnose receptacle 15 of connection tool 1. Now it may be necessary to rotate terminal head 9 about the flowline axis until connector hub 14 is properly oriented with respect to wellhead 3. Rotation may be necessary since there is a tendency for the flowline 12 to twist as it is pulled toward connection tool 1.

Figure 4:
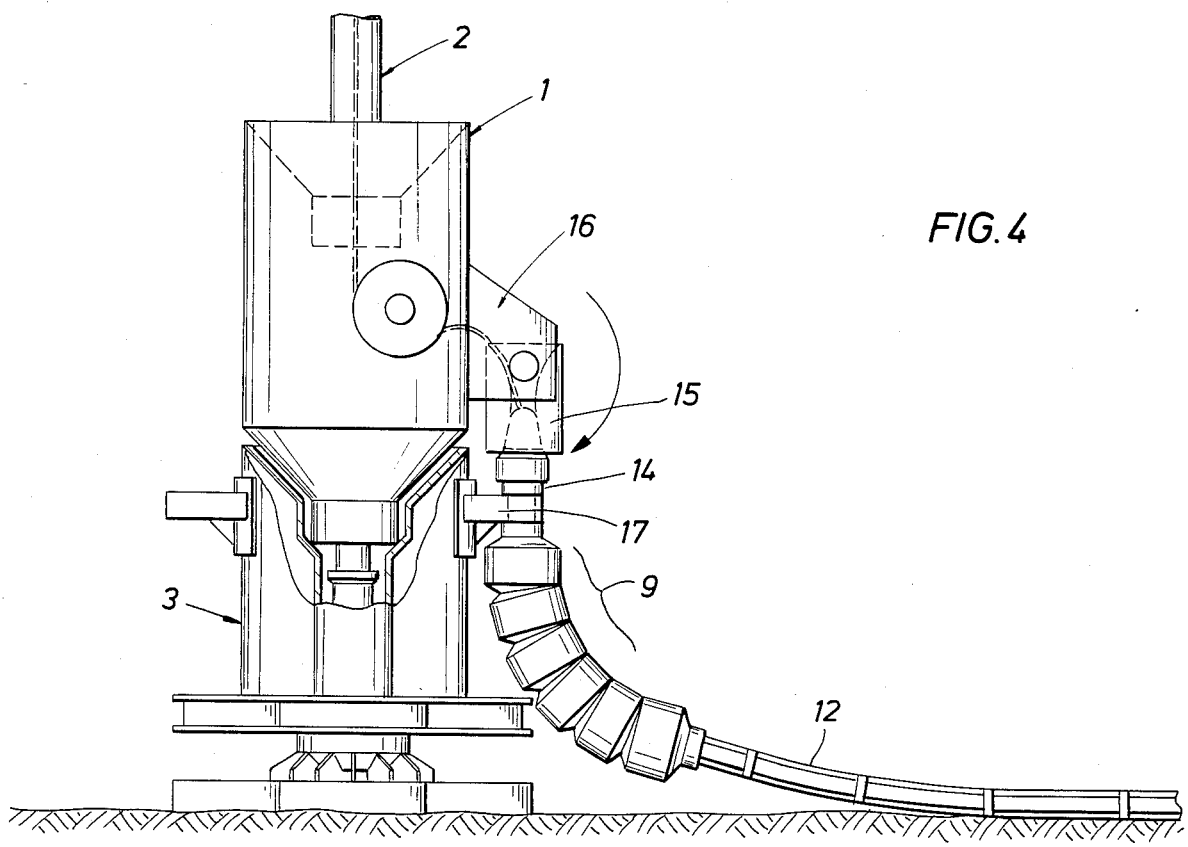
FIG. 4 depicts rotating the bullnose receptacle downward in order to bend the flowline into alignment with the flowline receptacle on the wellhead.

Next, the bullnose receptacle 15 is rotated downward, as indicated by the direction of the arrow in FIG. 4, thus bending the flowline 12 and flowline terminal head 9 into alignment with the flowline clamp 17. Hereinafter, reference to the "bullnose receptacle" includes both the receptacle 15 and the mechanism 16 to which the receptacle 15 is rotatably connected, and includes the guide arm 19 of a second embodiment of the invention. After being thus bent into position, the upper portion of terminal head 9 extends upwardly while the bottom portion extends laterally away from wellhead 3. At this time, the connector hub 10 is gripped by flowline clamp 17. Preferably, flowline clamps 17 are provided in two or more sites around wellhead 3, to facilitate the laying of flowlines to the wellhead from various approach directions.

Flowlines for subsea satellite wells and other subsea structures normally have sufficient wall thickness so that the pipes may be field-bent as indicated above without danger of buckling. However, for added protection against buckling this invention includes a carrier pipe of interlocking rings 20 which encircles the flowline, covering the length of pipe that receives the most bending. By "locking up" at a certain predetermined curvature, the carrier pipe thereby limits the degree of bending which that section of pipe can receive. Also, included in this invention are a series of buoyant rings 11 which encircle the carrier pipe. The bend-limiting carrier pipe 20 and the weight-limiting buoyant rings 11 are more particularly described hereinafter with reference to FIGS. 10-12.

Figure 5:
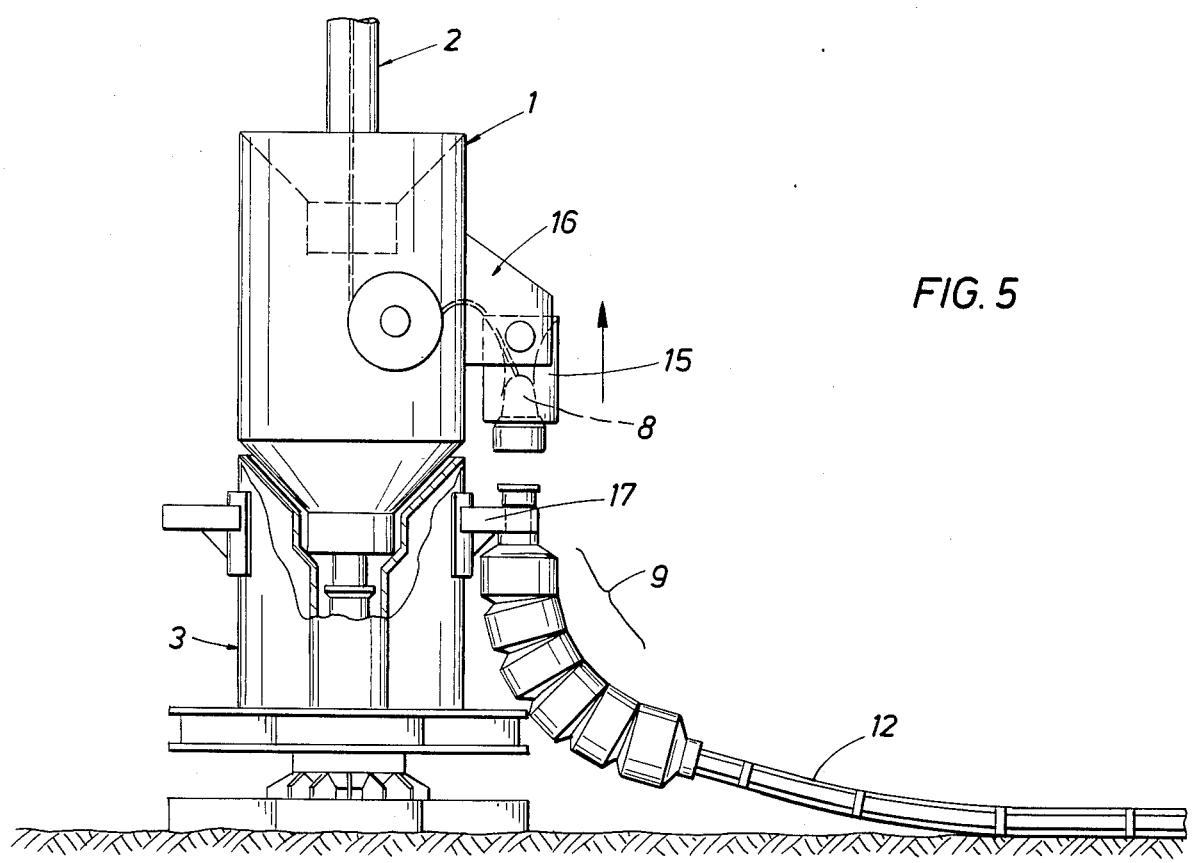
FIG. 5 discloses removing the bullnose from the terminal head after securing the terminal head to the flowline receptacle.

The procedure for removing bullnose 8 is shown in FIG. 5. As indicated by the direction of the arrow, the bullnose receptacle 15 is moved upwardly to remove bullnose 8 from terminal head 9, leaving terminal head 9 suspended solely from flowline clamp 17. Bullnose 8 is left inside bullnose receptacle 15, pending recovery of connection tool 1 to the surface.

Figure 6:
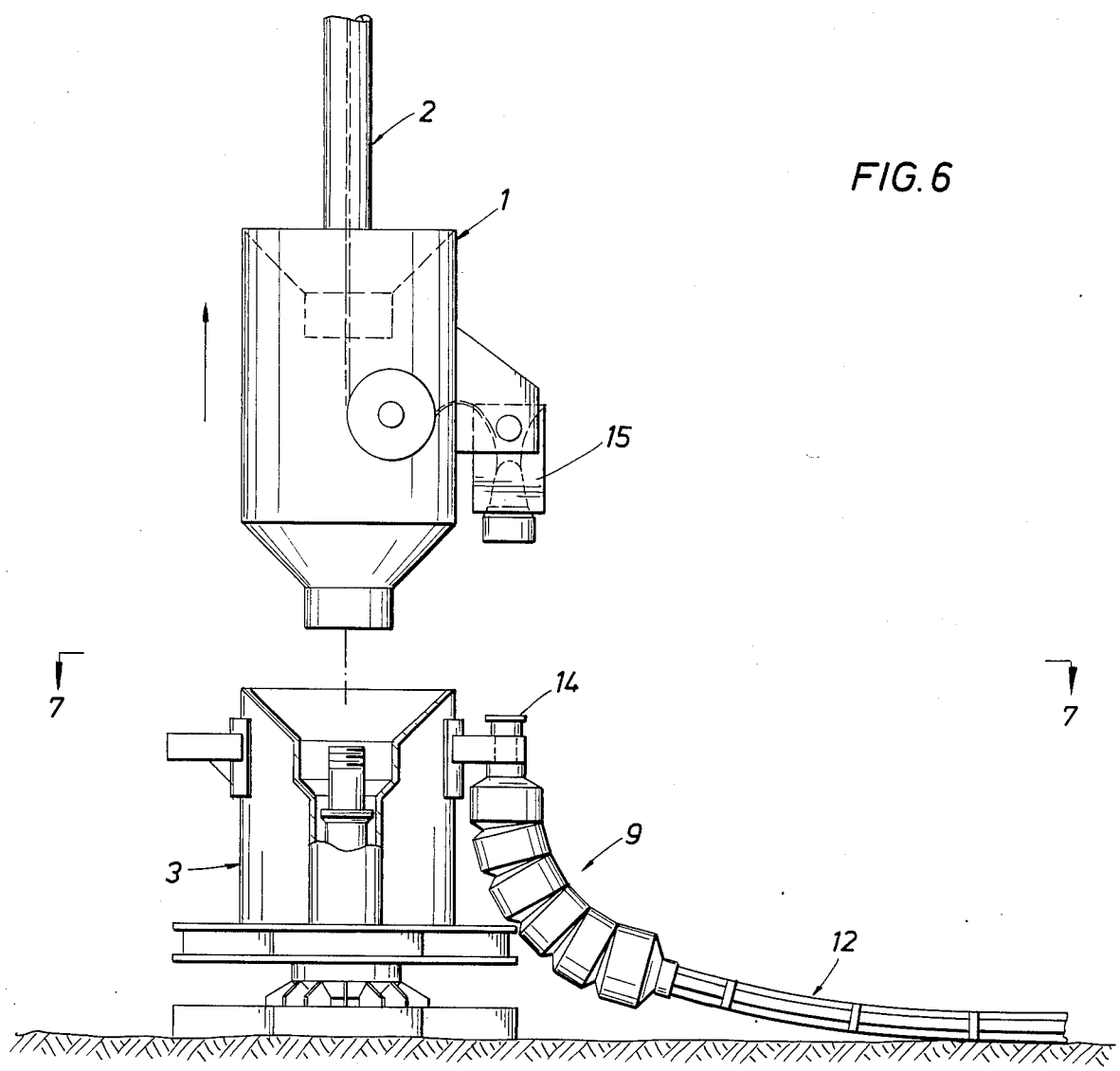
FIG. 6 discloses recovering the connection tool and riser to the surface.
Figure 7:
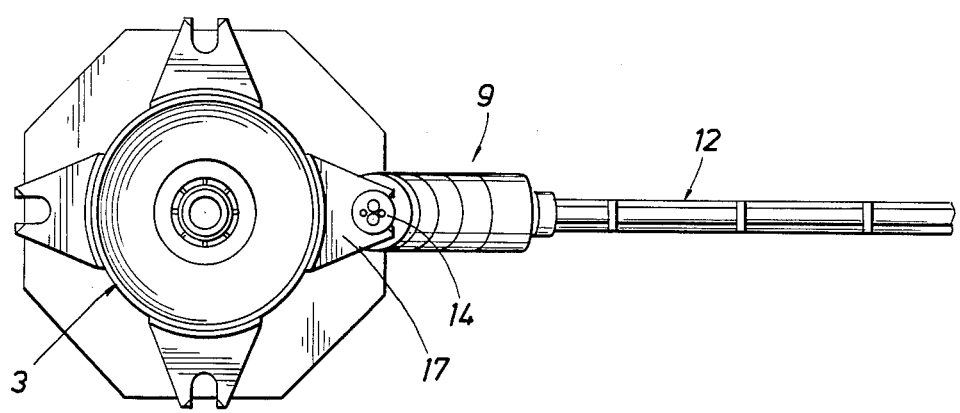
FIG. 7 provides a plan view of the wellhead, flowline, and terminal head shown in FIGS. 2-6.

FIG. 6 shows recovering the flowline connection tool 1 to the surface, after having disengaged the connection tool 1 from the wellhead 3. The flowline 12 is now properly positioned to make fluid connection with a tree (not shown—to be installed later onto wellhead 3) via connector hub 14 of flowline terminal head 9.

Figure 8:
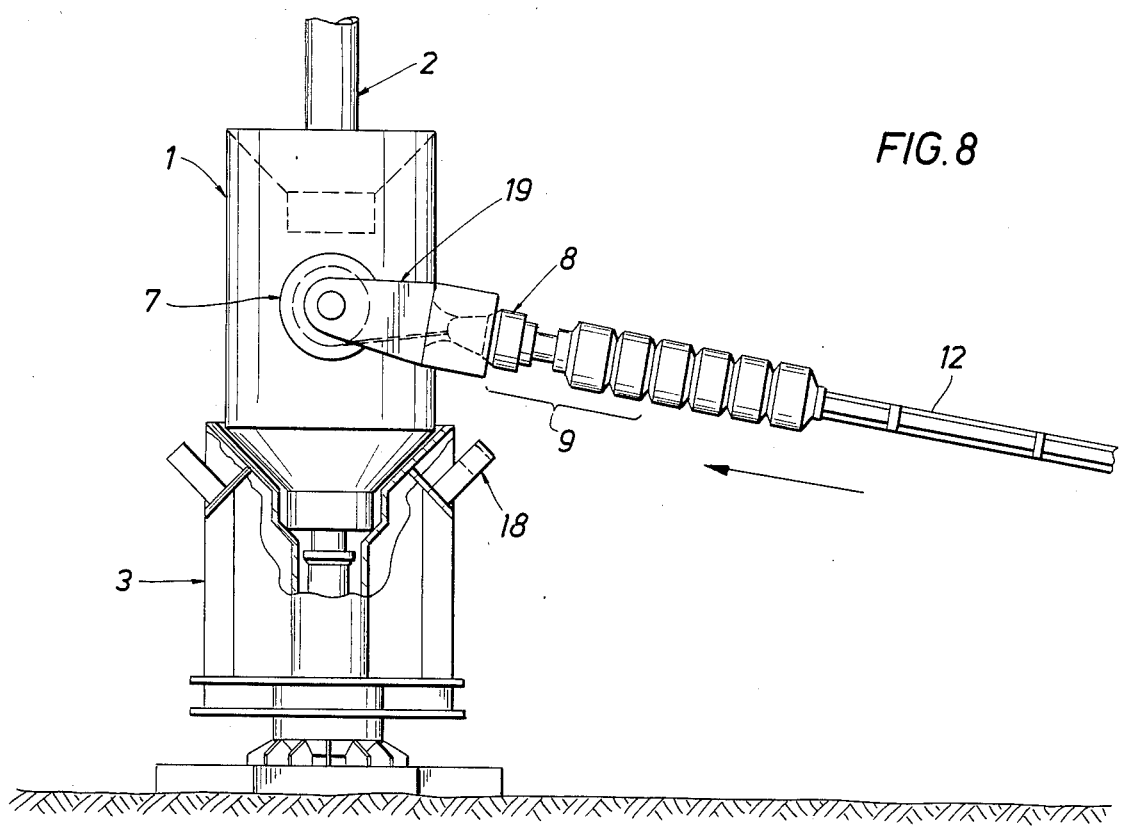
FIGS. 8 and 9 show an alternative embodiment of the invention wherein a lesser degree of bending is required to align the flowline with the flowline receptacle.
Figure 9:
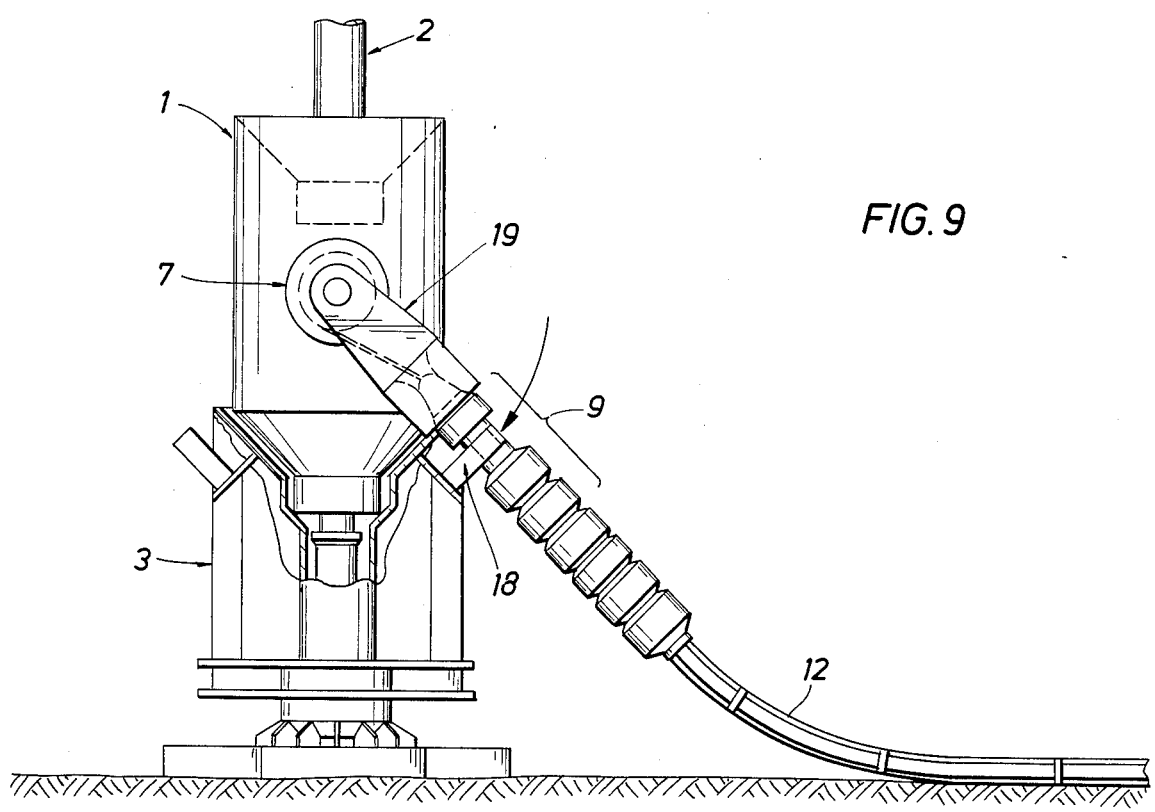

FIGS. 8 and 9 show an alternative embodiment of the invention wherein terminal head 9 is not bent to the same degree as in the first embodiment of the invention. Thus, an inclined flowline clamp 18 is provided as part of wellhead 3. Bullnose 8 of flowline terminal head 9 is received by bullnose receptacle 19 which is movably attached to flowline connection tool 1. Rotation of bullnose receptacle 19 downward, as indicated by the direction of the arrow in FIG. 9, bends the terminal head 9 into alignment with flowline clamp 18.

Figure 10:
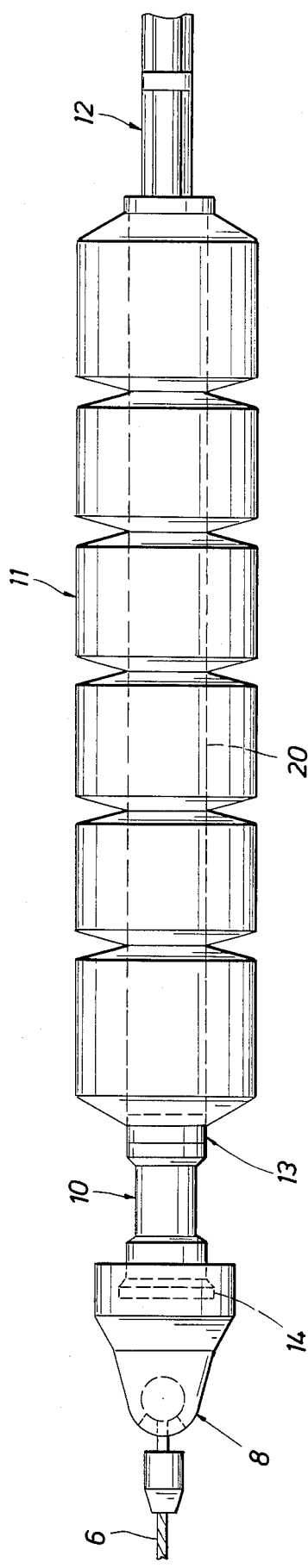
FIG. 10 provides a detailed view of the flowline terminal head.
Figure 12:
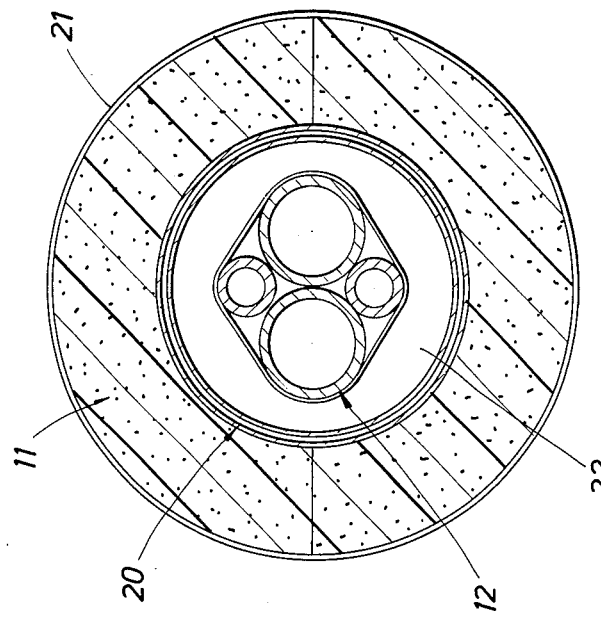
FIGS. 11 and 12 disclose enlarged sectional views of FIG. 10.
Figure 11:
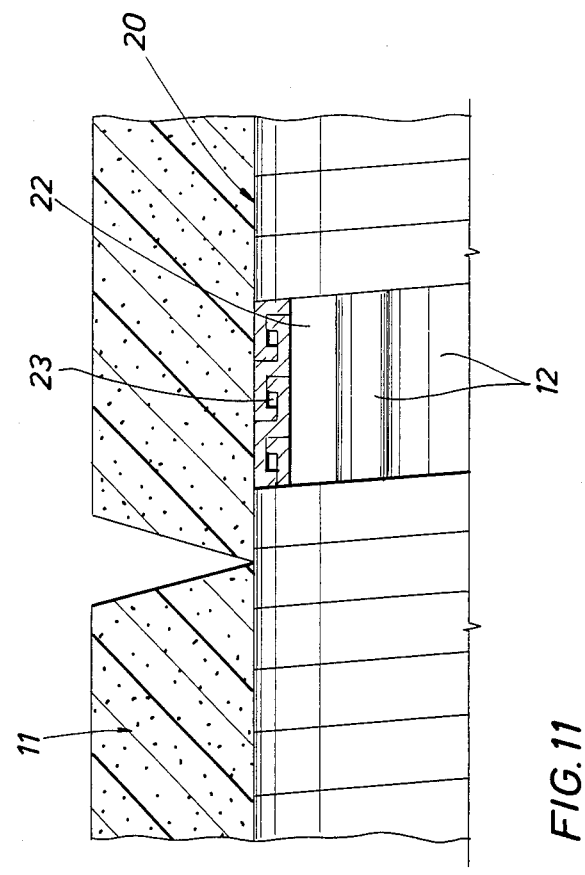

Terminal head 9 is more particularly shown in FIGS. 10-12. Flowline bundle 12 is welded to bulkhead 13 which is an integral part of the terminal head together with clamping surface 10 and connector hub 14. Bullnose 8 is attached to pullcable 6 and removably attached to connector hub 14. Carrier pipe of interlocking rings 20 is attached to bulkhead 13 and encloses flowline bundle 12 over sufficient length to protect flowlines from excessive bending. Interlocking rings 20, preferably steel, shown by the enlarged half-section view in FIG. 11, serve to limit the bend radius of terminal head 9. Buoyancy modules 11, preferably syntactic foam, fit around interlocking carcass rings 20 and are bound thereto by strap 21, preferably steel. The interlocking rings 20 are preferably of an "S" shape with a space 23 being left between tips of the S's which provides, according to the space left, limited movement in forming the bend radius of terminal head 9.

The foregoing description of the invention is merely intended to be explanatory thereof, and various changes in the details of the described method and apparatus may be made within the scope of the appended claims without departing from the spirit of the invention.

What is claimed is:

1. A method for connecting a flowline to a subsea structure comprising:
    deploying a riser and flowline connection tool downwardly to the subsea structure;
    landing and securing the connection tool onto the subsea structure;
    pulling a flowline terminal head, the terminal head being connected to the flowline, to the flowline connection tool;
    bending the flowline terminal head into a curve having two connected legs, one leg extending upwardly alongside the subsea structure and the other leg extending laterally away from the subsea structure;
    securing the flowline terminal head to the subsea structure; and
    recovering the flowline connection tool to the surface.

2. The method of claim 1 including securing the flowline terminal head to the flowline connection tool by pulling a bullnose of the flowline terminal head into a bullnose receptacle of the flowline connection tool.

3. The method of claim 2 including using the bullnose receptacle to twist the flowline terminal head into proper orientation relative to the subsea structure.

4. The method of claim 2 including using the bullnose receptacle to bend the flowline terminal head into alignment with a flowline clamp of the subsea structure.

5. The method of claim 4 wherein the flowline terminal head is secured to the subsea structure by inserting a connector hub, which is integral with the terminal head, into a connector hub receptacle of the flowline clamp of the subsea structure.

6. The method of claim 5 including removing the bullnose from the flowline terminal head using the bullnose receptacle.

7. An apparatus for connecting a flowline to a subsea structure comprising:
    means for deploying a riser and flowline connection tool downwardly to the subsea structure;
    means for landing and securing the flowline connection tool onto the subsea structure;
    means for pulling a flowline terminal head, the terminal head being connected to the flowline, to the flowline connection tool;
    means for bending the flowline terminal head into two connected legs;
    means for securing the flowline terminal head to the subsea structure; and
    means for recovering the flowline connection tool to the surface.

8. The apparatus of claim 7 including means for securing the flowline terminal head to the flowline connection tool by pulling a bullnose of the flowline terminal head into a bullnose receptacle of the flowline connection tool.

9. The apparatus of claim 8 including means for using the bullnose receptacle to twist the flowline terminal head into proper orientation relative to the subsea structure.

10. The apparatus of claim 8 including means for using the bullnose receptacle to bend the flowline terminal head into alignment with a flowline clamp of the subsea structure.

11. The apparatus of claim 10 including means for securing a connector hub, which is integral with the flowline terminal head, to the flowline clamp of the subsea structure.

12. The apparatus of claim 11 including means for removing the bullnose from the flowline terminal head using the bullnose receptacle.

* * * * *